US012656366B2

(12) United States Patent
Adibhatla et al.

(10) Patent No.: US 12,656,366 B2
(45) Date of Patent: Jun. 16, 2026

(54) AIRCRAFT SENSOR SIMULATION CALIBRATION SYSTEMS AND METHODS

(71) Applicant: General Electric Company, Schenectady, NY (US)

(72) Inventors: Sridhar Adibhatla, Cincinnati, OH (US); James R. Reepmeyer, Montgomery, OH (US)

(73) Assignee: General Electric Company, Schenectaday, NY (US)

( * ) Notice: Subject to any disclaimer, the term of this patent is extended or adjusted under 35 U.S.C. 154(b) by 72 days.

(21) Appl. No.: 18/507,510

(22) Filed: Nov. 13, 2023

(65) Prior Publication Data

US 2025/0155468 A1     May 15, 2025

(51) Int. Cl.
G01P 5/175 (2006.01)
G01P 21/02 (2006.01)

(52) U.S. Cl.
CPC ............ G01P 5/175 (2013.01); G01P 21/025 (2013.01)

(58) Field of Classification Search
CPC ............................... G01P 21/025; G01P 5/175
See application file for complete search history.

(56) References Cited

U.S. PATENT DOCUMENTS

| | | | | |
|---|---|---|---|---|
| 6,305,218 | B1 * | 10/2001 | Foster | ..................... G01P 5/175 |
| | | | | 73/178 R |
| 8,150,566 | B2 | 4/2012 | Feau | |

| | | | |
|---|---|---|---|
| 8,515,711 | B2 | 8/2013 | Mitchell |
| 9,043,054 | B2 | 5/2015 | Feau |
| 9,127,597 | B2 | 9/2015 | Masiello |
| 9,753,052 | B2 | 9/2017 | Semat |
| 10,345,327 | B2 | 7/2019 | Delporte |
| 11,067,592 | B2 | 7/2021 | Hurst |
| 11,097,852 | B2 | 8/2021 | Turner |
| 11,248,989 | B2 | 2/2022 | Somanath |
| 2017/0243413 | A1 | 8/2017 | Haggerty et al. |
| 2018/0068498 | A1 | 3/2018 | Hodge |

FOREIGN PATENT DOCUMENTS

| | | | | |
|---|---|---|---|---|
| CN | 110346605 | B  * | 10/2019 | .............. G01P 21/02 |
| CN | 113204921 | | 8/2021 | |
| CN | 113532685 | | 10/2021 | |

(Continued)

*Primary Examiner* — Aniss Chad
(74) *Attorney, Agent, or Firm* — Smith Gambrell & Russell LLP

(57)     ABSTRACT

A control system may generate a first simulated value for an aircraft sensor by applying one or more first input parameters to a sensor map model via a processor. The control system may compare the first simulated value and the first output of the aircraft sensor to determine a first calibration value and save calibration data in a memory based on the first calibration value. The control system may generate a calibrated simulation value of the aircraft sensor based on the sensor map model and the calibration data. The control system may determine validity of a second output of the aircraft sensor, utilize the second output of the aircraft sensor to perform an operation of the aircraft when the second output of the aircraft sensor is valid, and utilize the calibrated simulation value to perform the operation of the aircraft when the second output of the aircraft sensor is invalid.

20 Claims, 6 Drawing Sheets

(56) References Cited

FOREIGN PATENT DOCUMENTS

| | | |
|----|---------|--------|
| EP | 2977769 | 1/2016 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

AIRCRAFT SENSOR SIMULATION CALIBRATION SYSTEMS AND METHODS

TECHNICAL FIELD

These teachings relate generally to aircraft systems and more particularly to systems and methods for calibrating outputs of an aircraft sensor map model.

BACKGROUND

Aircrafts generally employ various types of sensors to gather information about flight and/or engine operating conditions. Some aircraft systems replace or backup some of the sensors with sensor map models. In particular, these sensor map models receive and process one or more input parameters to generate a simulated output of the replaced or backed-up sensor.

BRIEF DESCRIPTION OF DRAWINGS

Various needs are at least partially met through provision of the aircraft sensor simulation calibration systems and methods described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
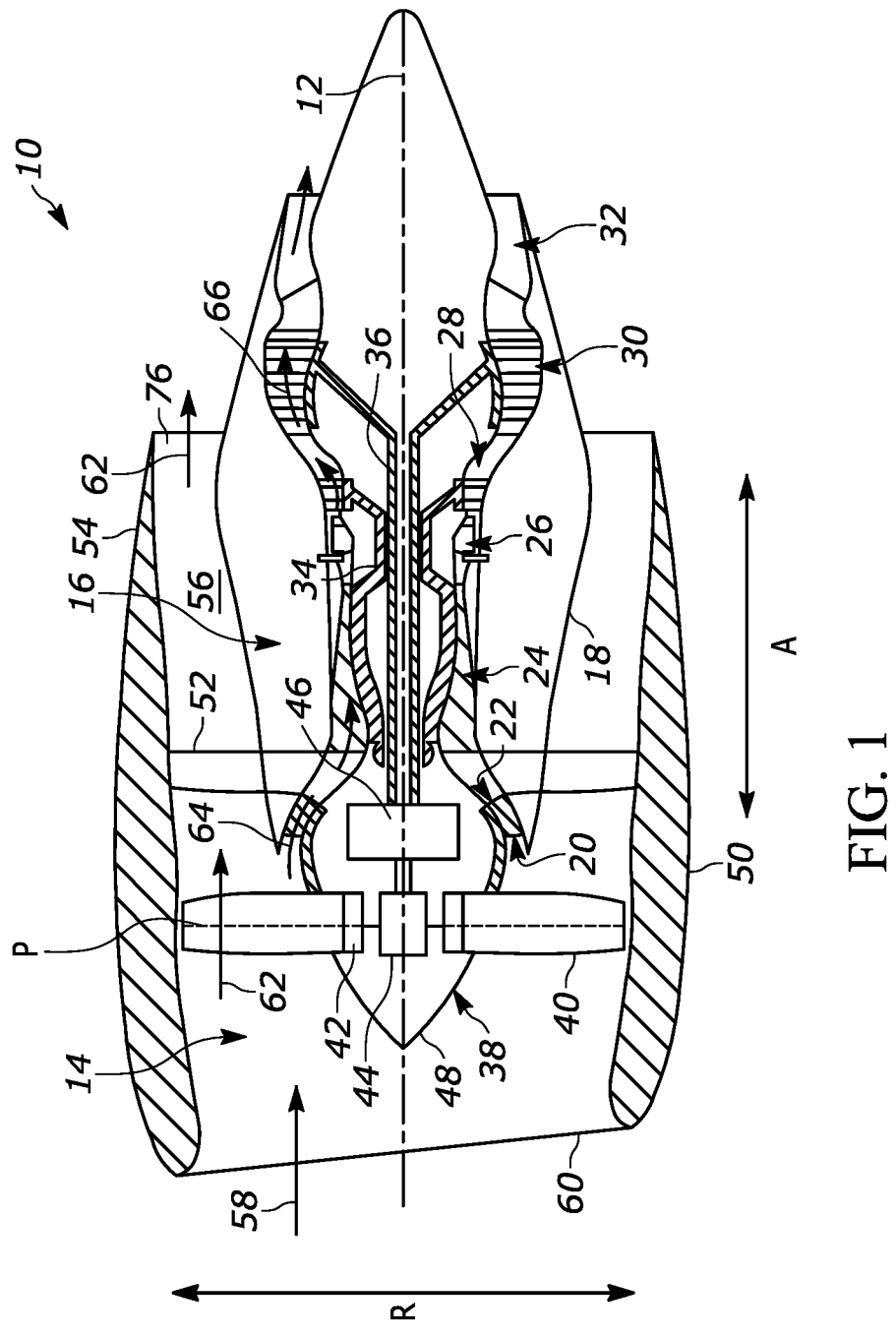
FIG. 1 is a cross-sectional view of a gas turbine engine for an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Aircraft engine control systems can employ models of sensors used in connection with controls of different engine operating parameters such as fan speed (N1), core speed (N2), compressor inlet temperature (T25), combustor inlet temperature (T3), and combustor inlet static pressure (Ps3). These "map models" can be used for selecting an output of one of two or more real sensors when those sensors disagree or for substitution of the sensors if multiple output channels of the real sensor indicate the sensor is faulty. Such map models can include models of engine inlet temperature, also known as total air temperature (TAT) and inlet pressure (P0) sensors that are used as backup sensors in case the aircraft provided inlet temperature or Mach number signals fail. In some cases where the aircraft includes short inlets or unducted fans, the primary sensor measurement of TAT or P0 can be infeasible, difficult, or only produces inaccurate measurements of those parameters. In some cases, the map models may be available as a data source. Pitot tube sensors that are prone to icing and other issues are can be used to measure Mach number, such that other map models that can output Mach number are utilized as backups. In particular, for Aircraft flight control systems employ sensing systems to measure Mach number, engine sensors, including both inlet sensors and internal sensors, can be used to create map models of Mach number that can be used as backups by the flight control system.

However, the most current configurations of map models for the various sensor outputs are not very accurate. In particular, the models' use of downstream engine sensors to estimate inlet parameters and other issues can produce a 2% to 5% error during steady-state operation of the aircraft and twice as much (e.g. 4-10%) or more error during transient/dynamic operation of the aircraft. These are all significant challenges in the context of aviation application settings.

Generally speaking, the various aspects of the present disclosure include an engine controller configured to calibrate sensor map models of engine sensors or other aircraft sensors to increase the accuracy of those sensors. In particular, the calibration process described herein utilizes actual sensor data to produce calibration values while the sensor output is valid (e.g., where output channels of the actual sensor agree with each other). These calibration values can be saved in a memory of the engine controller as a calibration curve or similar data format. The calibration values are then utilized to produce an improved accuracy map model by correcting inaccuracies using the real outputs from the aircraft sensor. These higher accuracy map model values reduce operability margin, performance (thrust) stack margin, etc., required in the engine, or improve flight control performance parameters that depend on an accurate Mach number. These higher accuracy calibrated map models may be applicable to all engines, including newly developed engines with improved clean, quiet, and efficient operation, and other commercial and military programs. Additionally, the calibration system and methods described herein can be retrofitted to existing engine applications.

The foregoing and other benefits may become clearer upon making a thorough review and study of the following detailed description.

Referring now to the drawings, wherein identical numerals indicate the same elements throughout the figures, FIG. 1 is a cross-sectional view of a gas turbine engine. The gas turbine engine is a high-bypass turbofan jet engine, referred to herein as "turbofan engine 10." The turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The tubular outer casing 18 encases, in serial flow relationship, a compressor section including a low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) spool 36 drivingly connects the LP turbine 30 to the LP compressor 22.

The fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by low pressure spool 36 across a power gear box 46. The power gear box 46 includes a plurality of gears for stepping down the rotational speed of the LP spool 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion 62 of the air 58 as indicated by arrow is directed or routed into the bypass airflow passage 56 and a second portion 64 of the air 58 as indicated by arrow is directed or routed into the LP compressor 22. The ratio between the first portion 62 of air 58 and the second portion 64 of air 58 is commonly known as a bypass ratio. The pressure of the second portion 64 of air 58 is then increased as it is routed through the HP compressor 24 and into the combustion section 26, where it is mixed with fuel and burned to provide combustion gases 66. Subsequently, the combustion gases 66 are routed through the hot flowpath, or hot-section flowpath, of the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan engine 10, also providing propulsive thrust.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2A:
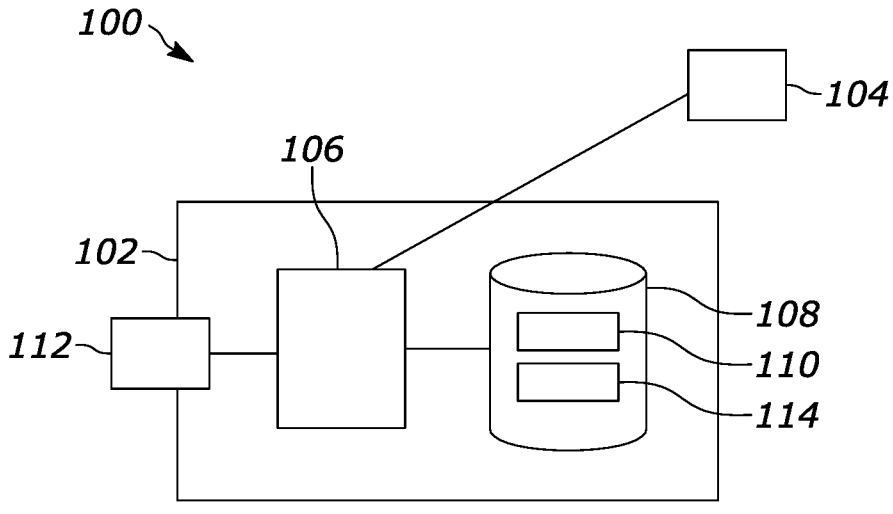
FIG. 2A shows a block diagram of an engine control system in accordance with various embodiments of these teachings.

Referring now to the drawings, and in particular to FIG. 2A, an aircraft control system 100 that is compatible with many of these teachings will now be presented. As shown in FIG. 2A, the aircraft control system 100 includes an engine controller 102 electrically coupled to an aircraft sensor 104. The sensor 104 and other sensors described herein can be mounted with respect to various features of the turbofan engine 10 so as to monitor various parameters of the turbofan engine 10. For example, the sensor 104 and other sensors described herein can include rotation speed sensors for monitoring the rotation speed of the fan section 14 and/or the core turbine engine 16, temperature sensors for monitoring the temperature of various sections of the turbofan engine 10 such as combustion section 26, the jet exhaust nozzle section 32, etc., pressure sensors for monitoring pressure at various locations of the turbofan engine 10 such as the associated inlet 60, jet exhaust nozzle section 32, fan nozzle exhaust section 76, etc., and/or other engine and aircraft related sensors known in the art.

Furthermore, the engine controller 102 includes a processor 106 electrically coupled to a memory 108, which has stored therein a sensor map model 110. The sensor map model 110 is executable by the processor 106 to simulate the aircraft sensor 104 (e.g., to generate output variables that would approximate the output of the aircraft sensor 104 under similar aircraft operating conditions). The sensor map model 110 can include a physics-based model, a data-based machine learning or algorithm model, a regression-based model, and/or various hybrid models. Some specific example models for Mach number include a Ps3-based model, a Ps12 method, and a dTs-based method.

An example model for simulating the rotational speed of the fan 40 (N1) can utilize a two parameter look up table using Mach number and N2K12 as inputs, where N2K12 is core speed corrected to inlet temperature (e.g., N2/sqrt (T12/Tstd)), and Tstd is the standard day temperature of 518.67 degrees Rankine.

Figure 2B:
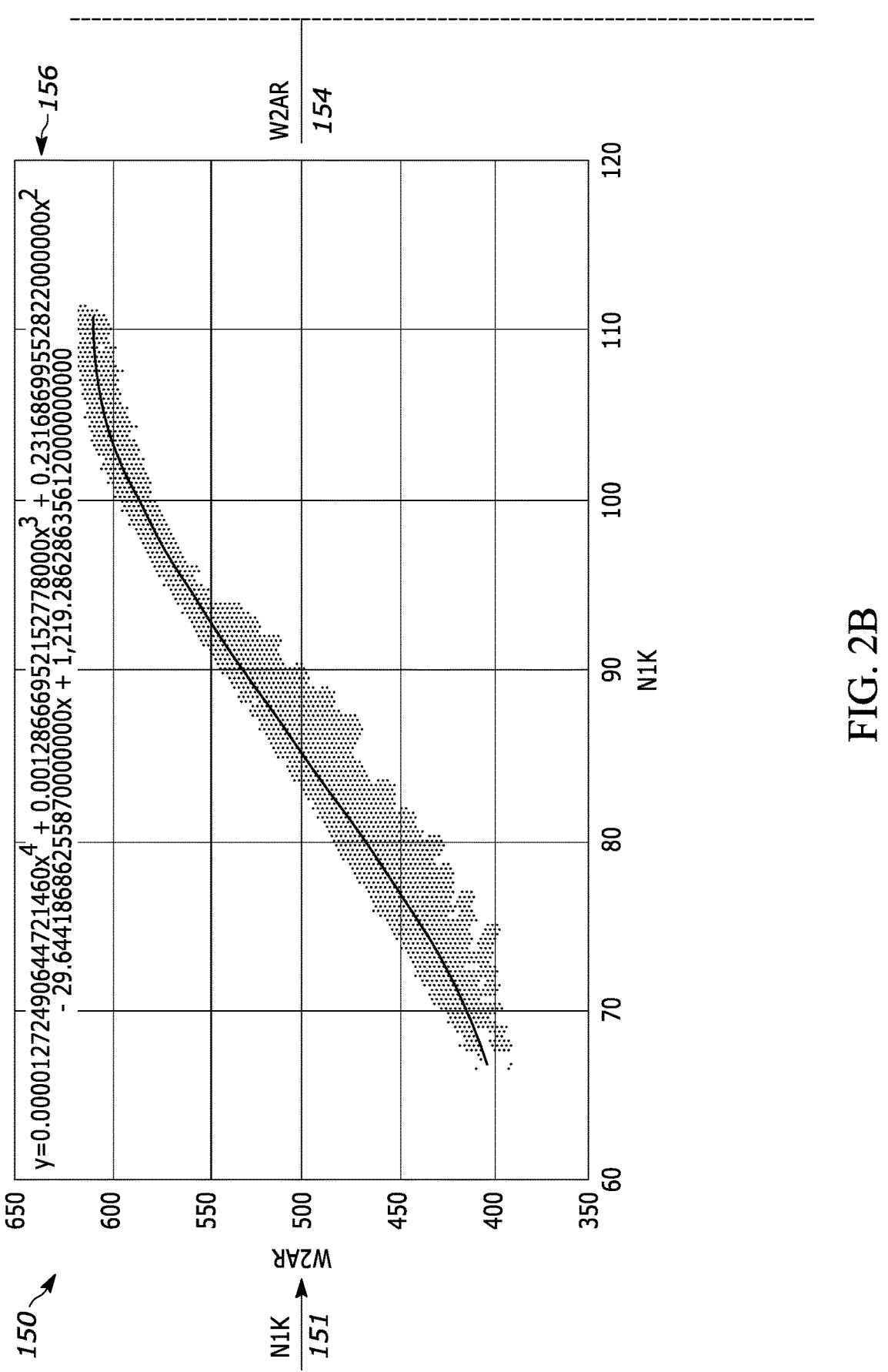
FIG. 2B shows a block diagram of an example model for simulating an aircraft Mach number.
Figure 2B:
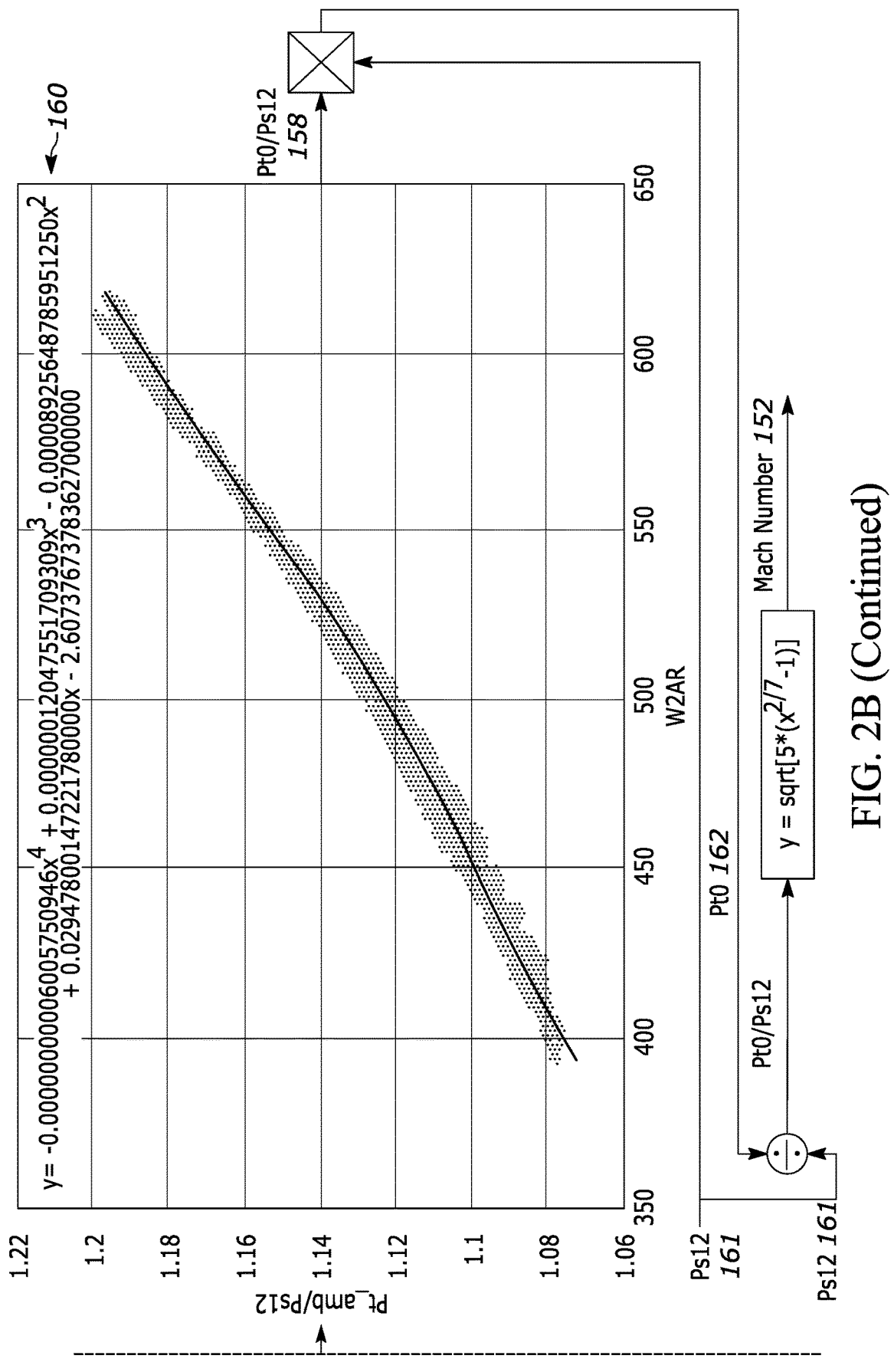

Additionally, an example model 150 for simulating the aircraft Mach number (e.g., MN) is shown in FIG. 2B. The model 150 utilizes fan speed (N1), engine inlet temperature (T12), and engine static inlet pressure (Ps12) to derive a simulated Mach number output 152. First, a corrected fan speed NIK value 151 (e.g., N1/sqrt (T12/Tstd)) is used to estimate a corrected inlet airflow (W2AR) value 154 using a table-lookup scheme or regression fit process 156. Then, the W2AR value 154 is used to estimate the ratio of inlet total to static pressure (Pt0/Ps12) value 158 using another table-lookup scheme or regression fit process 160. The Pt0/Ps12 value 158 is then multiplied by the Ps12 value 161 to produce an estimate of engine inlet total pressure Pt0 (i.e., estimated Pt0 value 162). Finally, the estimated Pt0 value 162 is used with the Ps12 value 161 to calculate Mach number according to Equation 1 below.

$$MN = \sqrt{5\left[\left(\frac{Pt0}{Ps12}\right)^{\frac{2}{7}} - 1\right]} \qquad \text{Equation 1}$$

Furthermore, as shown in FIG. 2A, the engine controller 102 includes an interface 112 through which first input parameters are received by the processor 106. The first input parameters can include an output of the aircraft sensor 104, outputs of other aircrafts sensors, and/or pilot control inputs. As described herein, the outputs of the aircraft sensor 104 and other aircraft sensors can include a rotational speed of the fan section 14 and/or core turbine engine 16, temperatures of various sections and components of the turbofan engine 10, a Mach number for the aircraft, an altitude for the aircraft, etc. Furthermore, the pilot control inputs can include but are not limited to a thrust or throttle input, a rudder position input, a flap position input, etc.

In operation, the processor 106 is configured to execute the sensor map model 110 using one or more of the first input parameters to generate a first simulated value for the aircraft sensor 104. The processor 106 is configured to compare the first simulated value and a first output of the aircraft sensor 104 to identify a first calibration value. The processor 106 is then configured to utilize the first calibration value to identify calibration data 114 for the sensor map model 110 and save the calibration data 114 in the memory 108. In some embodiments, the calibration data 114 is saved in a non-volatile controlled learning area of the memory 108. In some embodiments, the processor 106 is configured to perform one or more steps of method 300 described with reference to FIG. 4 herein.

The processor 106 is also configured to generate a calibrated simulation value of the aircraft sensor 104 based on the sensor map model 110 and the calibration data 114 saved in the memory. In some embodiments, the processor 106 generates the calibrated simulation value as a replacement for the output of the sensor 104, such as in cases where the output of the aircraft sensor 104 is determined to be invalid. In some embodiments, the processor 106 can compare different data output channels of the aircraft sensor 104 and determine that the output of the aircraft sensor 104 is invalid when the different data output channels differ by a predetermined threshold amount. For example, the predetermined threshold amount for determining validity of the aircraft sensor 104 can be 0.1 for Mach number embodiment of the aircraft sensor 104 and between 5 to 10 degrees Rankine for a total air temperature (TAT) embodiment of the aircraft sensor 104. Furthermore, in general, the predetermined threshold amount for determining validity of the aircraft sensor 104 can be a value of two to four times greater than a defined accuracy of the aircraft sensor 104.

The aircraft sensor 104 includes an aircraft engine sensor that outputs a parameter of an aircraft engine (e.g., engine speed, temperature, pressure, such as N1, T25, T3, PS3, etc.) or an aircraft macro-condition sensor that outputs an overall parameter of the aircraft (e.g., ambient pressure, ambient temperature, Mach number, etc.). When the aircraft sensor 104 includes the aircraft macro-condition sensor, one or more first input parameters received via the interface 112 and used for executing the sensor map model 110 can include first outputs of one or more aircraft engine sensors (e.g., sensors that report first engine temperature, pressure, etc.) and/or additional outputs from other aircraft macro-condition sensors. In some embodiments, the aircraft macro-condition sensor embodiment of the aircraft sensor 104 can include a pitot-static tube that outputs an aircraft speed or Mach number. When the aircraft sensor 104 includes the aircraft engine sensor, the one or more first input parameters can instead include first outputs of other aircraft engine sensors and/or aircraft macro-condition sensors.

The calibration data 114 and the calibration value calculated by the processor 106 can take a variety of different forms. For example, in some embodiments, the calibration value can include a difference between the first simulated value output from the execution of the sensor map model 110 and the first output of the aircraft sensor 104 (e.g. Calibration value or error=output of aircraft sensor 104-output of sensor map model 110).

In some embodiments, the first calibration value is used to perform a weighted update of the calibration data 114 saved in the memory 108. For example, an initial zero value of the calibration data 114 can be replaced with the first calibration value determined by the processor 106 and subsequent calibration values can be used to update the calibration data 114 initially stored using a forgetting factor. In particular, the calibration data 114 can be updated so that a new value of the calibration data 114 is equal to the sum of the 90% of the previous calibration data 114 and 10% of the first calibration value. (e.g., new calibration data 114=[Previous calibration data 114]*0.9+[First calibration value]*0.1). This update process can also be utilized in embodiments where the calibration data 114 includes a plurality of different values stored in the memory 108 such as those discussed in more detail below. Furthermore, in situations where the aircraft sensor 104 is replaced by a new or repaired sensor, the calibration data 114 can be returned to the initial zero value.

In some embodiments, the processor 106 saves the first calibration value as one of a plurality of entries in a calibration table along with a plurality of prior calibration values to form the calibration data 114. In particular, the calibration table can be initially empty and populated on the first and second flights of the aircraft as new values of the output from the sensor map model 110 are encountered. For example, as engine power level increases, higher and higher values of N1 are encountered.

The calibration table can cross-reference each of the first calibration value and the prior calibration value with one or more recall parameters that the processor 106 uses to select a specific entry in the calibration table when generating the calibrated simulation value of the aircraft sensor 104. For example, as shown in Table 1 and Table 2 below, the one or more recall parameters for embodiments where the sensor map model 110 includes the example model 150 shown in FIG. 2B can include a fan speed percentage (e.g. a fan speed measured from a sensor, set as a pilot input, etc.) and/or the output of the sensor map model 110 (e.g. an estimated Mach number from the example model 150).

TABLE 1

| % Fan Speed | Mach Number Calibration Value |
|---|---|
| 20% | 0.02 |
| 40% | −0.01 |
| 60% | 0.03 |
| 80% | 0 |
| 100% | −0.01 |

TABLE 2

| Mach Estimate | Mach Number Calibration Value |
|---|---|
| 0.05 | −0.02 |
| 0.10 | −0.01 |
| 0.20 | 0.01 |
| 0.40 | 0.03 |
| 0.50 | 0.04 |
| 0.60 | 0.02 |
| 0.80 | −0.01 |

Figure 3:
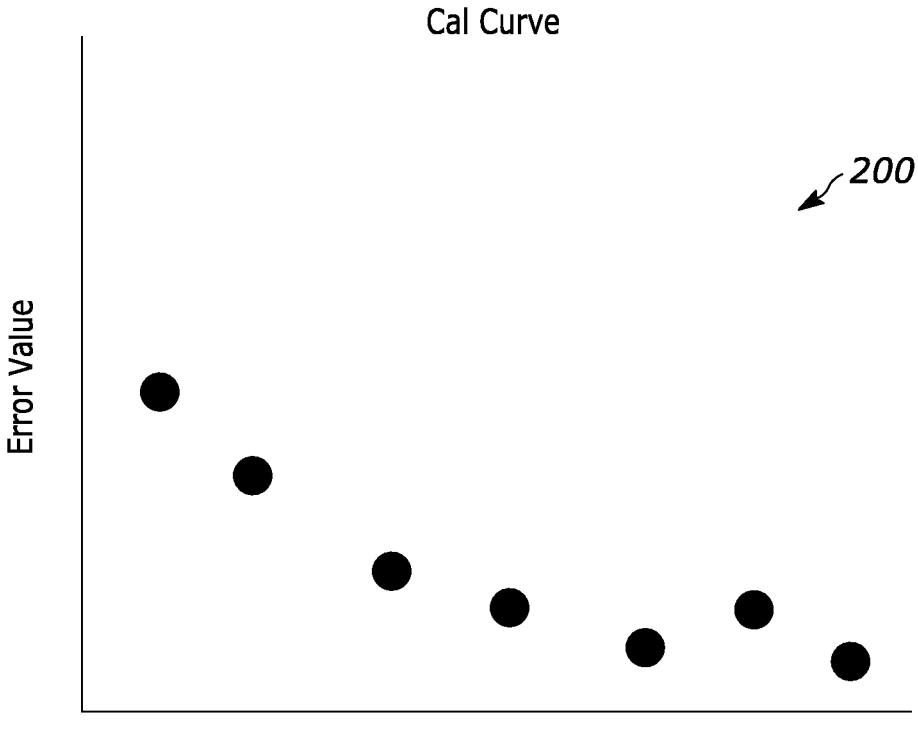
FIG. 3 shows a graph of a calibration curve as configured in accordance with various embodiments of these teachings.

Furthermore, as shown in FIG. 3, the plurality of entries in the calibration table can be mapped as a calibration curve 200 that shows the association with the specific entry or error value and the corresponding recall parameter. For the curve shown in FIG. 3, the recall parameters include the original output of the sensor map model 110 at the time each calibration value entry was calculated and saved into the memory 108. In these embodiments, the processor 106 selects one of the plurality of entries in the calibration table using a second simulated value of the aircraft sensor 104 output from execution of the sensor map model 110 using one or more second input parameters and modifies the second simulated value with the selected one of the plurality of entries in the calibration table to generate the calibrated simulation value.

The calibration curve 200 is a one dimensional correction curve (e.g., $z=f(x)$). However, higher order correction curves (e.g., $z=f(x, y)$, etc.) that employ additional recall parameters or parameter sets are possible. For example, in some embodiments, the recall parameters or parameters sets for each calibration value entry can include the input parameter or set of parameters used to generate the calibration value entry in the table (e.g., a sensor value, ratio of inlet total to ambient pressure values PT2/P0, corrected percent fan speed PCN1K, Fan Pitch Angle, etc.). In these embodiments, the processor 106 selects one of the plurality of entries in the calibration table using the one or more second input parameters for the sensor map model 110 received by the processor 106 and then modifies the second simulated value that is output from execution of the sensor map model 110 with the selected one of the plurality of entries in the calibration table to generate the calibrated simulation value.

Furthermore, in some embodiments, the calibration data 114 can include a calibration function generated and/or updated by the processor 106 using the first calibration value and additional calibration values stored in the memory 108. In these embodiments, the processor 106 applies one or more second input parameters for the sensor map model received by the processor 106 to the calibration function to generate a first output of the calibration function, and modifies the second simulated value of the aircraft sensor 104 output from execution of the sensor map model 110 using the one or more second input parameters with the first output of the calibration function to generate the calibrated simulation value.

Figure 4:
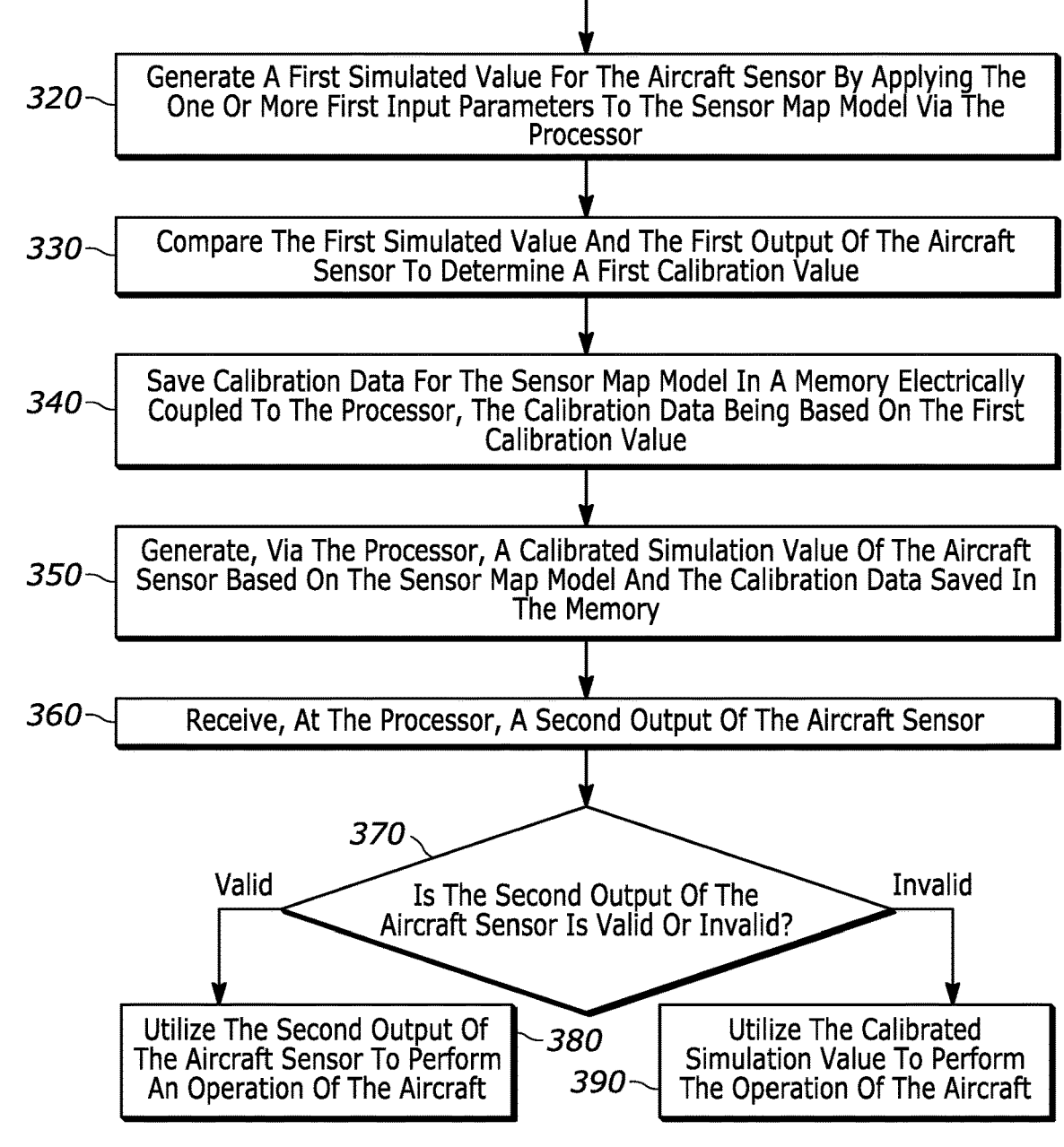
FIG. 4 is a flow diagram of a method as configured in accordance with various embodiments of these teachings.

The aircraft control system 100 can be utilized in a method 300 for aircraft sensor simulation calibration. As shown in FIG. 4, the method 300 includes receiving, at the processor 106, one or more first input parameters for the sensor map model 110 for simulating the aircraft sensor 104 and a first output of the aircraft sensor 104, as in 310 and 315. In some embodiments, the aircraft sensor 104 includes an aircraft macro-condition sensor. In these embodiments, the one or more first input parameters include first outputs of one or more aircraft engine sensors. The aircraft macro-condition sensor can include a pitot-static tube that outputs an aircraft speed or Mach number. In some embodiments, the aircraft sensor 104 includes an aircraft engine sensor and the one or more first input parameters include first outputs of other aircraft engine sensors and/or aircraft macro-condition sensors.

Then, following the steps 310 and 315, the method 300 includes generating the first simulated value for the aircraft sensor 104 by applying the one or more first input parameters to the sensor map model 110 via the processor 106, as in 320. For example, where the sensor map model 110 includes the example model 150 shown in FIG. 2B, the method 300 can include generating the first simulated value for the aircraft sensor 104 (e.g., the simulated MN output 152) by processing the fan speed (N1), engine inlet temperature (T12), and engine static inlet pressure (Ps12) (e.g., the first input parameters) as described herein. It will be appreciated that the step 320 is not limited to use of the example model 150. Specifically, other sensor map models, such as the example model for simulating the rotational speed of the fan 40 described herein and other sensor map models known in the art, can also be used as part of the method 300.

After the first simulated value for the aircraft sensor 104 is generated, the method 300 includes comparing the first simulated value and the first output of the aircraft sensor 104 to determine the first calibration value, as in 330. For example, the method 300 can include comparing a MN of 0.5 as output from the aircraft sensor 104 to a MN of 0.46 as output from sensor map model 110 (e.g., the example model 150 of FIG. 2B) and comparing those outputs to generate the first calibration value in one of the manners described herein. Then, the method 300 includes saving the calibration data 114 for the sensor map model 110 in the memory 108 electrically coupled to the processor 106, as in 340. The calibration data 114 is based on the first calibration value and can include any of the various forms described herein.

In some embodiments, the method 300 includes identifying a difference between the first simulated value and the first output and saving the difference in the memory as the calibration data. For example, where the a MN of 0.5 is the output from the aircraft sensor 104 and the MN of 0.46 is output from sensor map model 110, the calibration data would be +0.04. In some embodiments, the method 300 includes identifying a difference between the first simulated value and the first output to identify the first calibration value and saving the calibration data in the memory by performing a weighted update of prior calibration data saved in the memory using the first calibration value. For example, where the prior calibration data is a value of +0.02 and the first calibration value is +0.04, the calibration data after the weighted update can be +0.022 (e.g., 0.02*0.9+0.04*0.1).

Furthermore, in some embodiments, the method 300 includes saving the first calibration value as one of a plurality of entries in a calibration table along with a plurality of prior calibration values to form the calibration data. In some embodiments, the method 300 can include saving the first calibration value as one of a plurality of entries in a calibration table along with a plurality of prior calibration values and generating a calibration function from the plurality of entries in the calibration table. In these embodiments, the calibration data is the output of the calibration function which can constitute a polynomial expression for which the independent variable or variables of the function include the output of the aircraft sensor 104, the input parameters for the sensor map model 110, and/or other parameters of the turbofan engine 10. For example, a quadratic fit using a vector of sensor inputs x, a vector of linear coefficients b, and a matrix of coefficients C can be expressed as: $Y=a+bx+xT[C]x$. Furthermore, for a simple example using two sensor inputs $x=[x1\ x2]$, this equation can be written as: $Y=a+b1*x1+b2*x2+c11*x1*x1+c12*x1*x2+c22*x2*x2$.

Then, after the step 340, the method 300 can include generating, via the processor 106, the calibrated simulation value of the aircraft sensor 104 based on the sensor map model 110 and the calibration data 114 saved in the memory 108, as in 350. As seen in FIG. 4 the method 300 also includes, receiving, at the processor 106, a second output of the aircraft sensor 104 (e.g., another MN output), as in 360. The method 300 also includes, determining whether the second output of the aircraft sensor 104 is valid or invalid, as in 370. When the second output of the aircraft sensor is valid, the method 300 includes utilizing the second output of the aircraft sensor 104 to perform an operation of the aircraft, as in 380. When the second output of the aircraft sensor is invalid, the method 300 includes utilizing the calibrated simulation value to perform the operation of the aircraft, as in 390. The operation of the aircraft can include operations such as modulating various control parameters for the turbofan engine 10 (e.g., amount of supplied fuel, positive or negative electric machine torque application, fan blade angle, etc.). Additionally or alternatively, the operation of the aircraft for which the calibrated simulation value is used can include generation or calculation of other engine operating parameters that are displayed to a pilot of the aircraft or used for altering the control parameters for the turbofan engine 10.

In embodiments in which the first calibration value is saved as one of a plurality of entries in the calibration table, the method 300 can include receiving, at the processor 106, one or more second input parameters for the sensor map model 110 and generating a second simulated value for the aircraft sensor 104 by applying the one or more second input parameters to the sensor map model 110 via the processor 106. For example, where the sensor map model 110 includes the example model 150 shown in FIG. 2B, the method 300 can include generating the second simulated value for the aircraft sensor 104 in the same manner as described above for the first simulated value only using updated values for the fan speed (N1), engine inlet temperature (T12), and engine static inlet pressure (Ps12) (e.g., the second input parameters) as described herein. Next, the method 300 can include selecting one of the plurality of entries in the calibration table using the one or more second input parameters and/or the second simulated value and modifying the second simulated value with the selected one of the plurality of entries in the calibration table to generate the calibrated simulation value. For example, where the second simulated value for the aircraft sensor 104 is a MN of 0.46 and the selected entry from the calibration table is +0.04, the calibrated simulation value is a MN of 0.5 that can be used in place of the output of the aircraft sensor 104.

In embodiments that employ the calibration function, the method 300 includes receiving, at the processor 106, one or more second input parameters for the sensor map model 110 and generating a second simulated value for the aircraft sensor 104 by applying the one or more second input parameters to the sensor map model 110 via the processor 106. Then, the method 300 can include generating a first output of the calibration function by applying the one or more second input parameters, or other parameters corresponding to the independent variables of the calibration function, to the calibration function and modifying the second simulated value with the first output of the calibration function to generate the calibrated simulation value.

In some embodiments, the method 300 can return to step 310 and continue to loop through each of the steps 310, 315, 320, 330, 340, 350, 360, 370, 380, 390 and other steps described herein so long as the aircraft is operating.

The calibration values as generated using the systems and methods described herein are applied to produce an improved accuracy in sensor map model outputs that are used to replace the outputs of one or more engine sensors whose output has become invalid or unreliable. These higher accuracy map model output values reduce operability margin, performance (thrust) stack margin, etc., required in the engine, or improve flight control performance parameters that depend on an accurate Mach number. These higher accuracy calibrated map model outputs may be applicable to all engines, including newly developed engines with improved clean, quiet, and efficient operation, and other commercial and military programs.

Further aspects of the disclosure are provided by the subject matter of the following clauses:

A method for aircraft sensor simulation calibration, the method comprising: receiving, at a processor of an aircraft control system, one or more first input parameters for a sensor map model for simulating an aircraft sensor; receiving, at the processor, a first output of the aircraft sensor; generating a first simulated value for the aircraft sensor by applying the one or more first input parameters to the sensor map model via the processor; comparing the first simulated value and the first output of the aircraft sensor to determine a first calibration value; saving calibration data for the sensor map model in a memory electrically coupled to the processor, the calibration data being based on the first calibration value; generating, via the processor, a calibrated simulation value of the aircraft sensor based on the sensor map model and the calibration data saved in the memory; receiving, at the processor, a second output of the aircraft sensor; determining whether the second output of the aircraft sensor is valid or invalid; utilizing the second output of the aircraft sensor to perform an operation of the aircraft when the second output of the aircraft sensor is valid; and utilizing the calibrated simulation value to perform the operation of the aircraft when the second output of the aircraft sensor is invalid.

The method of any preceding clause wherein the aircraft sensor includes an aircraft macro-condition sensor and wherein the one or more first input parameters include first outputs of one or more aircraft engine sensors.

The method of any preceding clause wherein the aircraft macro-condition sensor includes a pitot-static tube that outputs an aircraft speed or Mach number.

The method of any preceding clause wherein the aircraft sensor includes an aircraft engine sensor and the one or more first input parameters include first outputs of other aircraft engine sensors and/or aircraft macro-condition sensors.

The method of any preceding clause further comprising identifying a difference between the first simulated value and the first output and saving the difference in the memory as the calibration data.

The method of any preceding clause further comprising: identifying a difference between the first simulated value and the first output to identify the first calibration value; and saving the calibration data in the memory by performing a weighted update of prior calibration data saved in the memory using the first calibration value.

The method of any preceding clause further comprising saving the first calibration value as one of a plurality of entries in a calibration table along with a plurality of prior calibration values to form the calibration data.

The method of any preceding clause further comprising: receiving, at a processor, one or more second input parameters for the sensor map model; generating a second simulated value for the aircraft sensor by applying the one or more second input parameters to the sensor map model via the processor; selecting one of the plurality of entries in the calibration table using the one or more second input parameters and/or the second simulated value; and modifying the second simulated value with the selected one of the plurality of entries in the calibration table to generate the calibrated simulation value.

The method of any preceding clause further comprising: saving the first calibration value as one of a plurality of entries in a calibration table along with a plurality of prior calibration values; generating a calibration function from the plurality of entries in the calibration table, wherein outputs of the calibration function includes the calibration data.

The method of any preceding clause further comprising: receiving, at a processor, one or more second input parameters for the sensor map model; generating a second simulated value for the aircraft sensor by applying the one or more second input parameters to the sensor map model via the processor; generating a first output of the calibration function by applying the one or more second input parameters to the calibration function; and modifying the second simulated value with the first output of the calibration function to generate the calibrated simulation value.

An aircraft control system composing: an engine controller having a processor and a memory; an aircraft sensor electrically coupled to the engine controller; a memory that stores a sensor map model executable by the processor to simulate the aircraft sensor, wherein the processor executes the sensor map model using one or more first input parameters that are received by the processor to generate a first simulated value for the aircraft sensor, wherein the processor compares the first simulated value and a first output of the aircraft sensor to identify a first calibration value, wherein the processor identifies calibration data for the sensor map model based on the first calibration value, wherein the processor generates a calibrated simulation value of the aircraft sensor based on the sensor map model and the calibration data saved in the memory, wherein the processor receives a second output of the aircraft sensor, wherein the processor determines whether the second output of the aircraft sensor is valid or invalid wherein the processor utilizes the second output of the aircraft sensor to perform an operation of the aircraft when the second output of the aircraft sensor is valid, and wherein the processor utilizes the calibrated simulation value to perform the operation of the aircraft when the second output of the aircraft sensor is invalid.

The aircraft control system of any preceding clause wherein the aircraft sensor includes an aircraft macro-condition sensor and the one or more first input parameters include first outputs of one or more aircraft engine sensors.

The aircraft control system of any preceding clause wherein the aircraft macro-condition sensor includes a pitot-static tube that outputs an aircraft speed or Mach number.

The aircraft control system of any preceding clause wherein the aircraft sensor includes an aircraft engine sensor and the one or more first input parameters include first outputs of other aircraft engine sensors and/or aircraft macro-condition sensors.

The aircraft control system of any preceding clause wherein the processor identifies a difference between the first simulated value and the first output as the first calibration value and performs a weighted update of the calibration data saved in the memory based on the first calibration value.

The aircraft control system of any preceding clause wherein the processor saves the first calibration value as one of a plurality of entries in a calibration table along with a plurality of prior calibration values to form the calibration data.

The aircraft control system of any preceding clause wherein the processor selects one of the plurality of entries in the calibration table using one or more second input parameters for the sensor map model received by the processor and/or a second simulated value of the aircraft sensor output from execution of the sensor map model using the one or more second input parameters, and wherein the processor modifies the second simulated value with the selected one of the plurality of entries in the calibration table to generate the calibrated simulation value.

The aircraft control system of any preceding clause wherein the calibration data includes a calibration function generated by the processor using the first calibration value and additional calibration values stored in the memory, wherein the processor applies one or more second input parameters for the sensor map model received by the processor to the calibration function to generate a first output of the calibration function, and wherein the processor modifies a second simulated value of the aircraft sensor the first output of the calibration function to generate the calibrated simulation value, the second simulated value of the aircraft sensor being output from execution of the sensor map model using the one or more second input parameters.

A non-transitory computer readable medium storing instructions that, when executed by a processor, cause performance of operations comprising: receiving, at a processor of an aircraft control system of an aircraft, one or more first input parameters for a sensor map model for simulating an aircraft sensor; receiving, at the processor a first output of the aircraft sensor; generating a first simulated value for the aircraft sensor by applying the one or more first input parameters to the sensor map model via the processor; comparing the first simulated value and the first output of the aircraft sensor to determine a first calibration value; saving calibration data for the sensor map model in a memory electrically coupled to the processor, the calibration data being based on the first calibration value; receiving, at the processor, a second output of the aircraft sensor; generating, via the processor, a calibrated simulation value of the aircraft sensor based on the sensor map model and the calibration data saved in the memory; determining whether the second output of the aircraft sensor is valid or invalid; utilizing the second output of the aircraft sensor to perform an operation of the aircraft when the second output of the aircraft sensor is valid; and utilizing the calibrated simulation value to perform the operation of the aircraft when the second output of the aircraft sensor is invalid.

The non-transitory computer readable medium of any preceding clause wherein the aircraft sensor includes an aircraft macro-condition sensor and wherein the one or more first input parameters include first outputs of one or more aircraft engine sensors.

The non-transitory computer readable medium of any preceding clause wherein the aircraft macro-condition sensor includes a pitot-static tube that outputs an aircraft speed or Mach number.

The non-transitory computer readable medium of any preceding clause the aircraft sensor includes an aircraft engine sensor and the one or more first input parameters include first outputs of other aircraft engine sensors and/or aircraft macro-condition sensors.

The non-transitory computer readable medium of any preceding clause wherein the instructions when executed by the processor cause performance of operations further comprising identifying a difference between the first simulated value and the first output and saving the difference in the memory as the calibration data.

The non-transitory computer readable medium of any preceding clause wherein the instructions when executed by the processor cause performance of operations further comprising: identifying a difference between the first simulated value and the first output to identify the first calibration value; and saving the calibration data in the memory by performing a weighted update of prior calibration data saved in the memory using the first calibration value.

The non-transitory computer readable medium of any preceding clause wherein the instructions when executed by the processor cause performance of operations further comprising saving the first calibration value as one of a plurality of entries in a calibration table along with a plurality of prior calibration values to form the calibration data.

The non-transitory computer readable medium of any preceding clause wherein the instructions when executed by the processor cause performance of operations further comprising: receiving, at the processor, one or more second input parameters for the sensor map model; generating a second simulated value for the aircraft sensor by applying the one or more second input parameters to the sensor map model via the processor; selecting one of the plurality of entries in the calibration table using the one or more second input parameters and/or the second simulated value; and modifying the second simulated value with the selected one of the plurality of entries in the calibration table to generate the calibrated simulation value.

The non-transitory computer readable medium of any preceding clause wherein the instructions when executed by the processor cause performance of operations further comprising: saving the first calibration value as one of a plurality of entries in a calibration table along with a plurality of prior calibration values; and generating a calibration function from the plurality of entries in the calibration table, wherein outputs of the calibration function comprise the calibration data.

The non-transitory computer readable medium of any preceding clause wherein the instructions when executed by the processor cause performance of operations further comprising: receiving, at the processor, one or more second input parameters for the sensor map model; generating a second simulated value for the aircraft sensor by applying the one or more second input parameters to the sensor map model via the processor; generating a first output of the calibration function by applying the one or more second input parameters to the calibration function; and modifying the second simulated value with the first output of the calibration function to generate the calibrated simulation value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for aircraft sensor simulation calibration, the method comprising:
   receiving, at a processor of an aircraft control system of an aircraft having a turbofan engine, one or more first input parameters for a sensor map model for simulating an aircraft sensor;
   receiving, at the processor, a first output of the aircraft sensor;
   generating a first simulated value for the aircraft sensor by applying the one or more first input parameters to the sensor map model via the processor;
   comparing the first simulated value and the first output of the aircraft sensor to determine a first calibration value;
   saving calibration data for the sensor map model in a memory electrically coupled to the processor, the calibration data being based on the first calibration value;
   generating, via the processor, a calibrated simulation value of the aircraft sensor based on the sensor map model and the calibration data saved in the memory;
   receiving, at the processor, a second output of the aircraft sensor;
   determining whether the second output of the aircraft sensor is valid or invalid;
   utilizing the second output of the aircraft sensor to perform an operation of the aircraft when the second output of the aircraft sensor is valid; and
   utilizing the calibrated simulation value to perform the operation of the aircraft when the second output of the aircraft sensor is invalid,
   wherein performing the operation comprises modulating at least one control parameter of the turbofan engine while the aircraft is operating.

2. The method of claim 1 wherein the aircraft sensor includes an aircraft macro-condition sensor and wherein the one or more first input parameters include first outputs of one or more aircraft engine sensors.

3. The method of claim 2 wherein the aircraft macro-condition sensor includes a pitot-static tube that outputs an aircraft speed or Mach number.

4. The method of claim 1 wherein the aircraft sensor includes an aircraft engine sensor and the one or more first input parameters include first outputs of other aircraft engine sensors and/or aircraft macro-condition sensors.

5. The method of claim 1 further comprising identifying a difference between the first simulated value and the first output and saving the difference in the memory as the calibration data.

6. The method of claim 1 further comprising:
   identifying a difference between the first simulated value and the first output to identify the first calibration value; and saving the calibration data in the memory by performing a weighted update of prior calibration data saved in the memory using the first calibration value.

7. The method of claim 1 further comprising saving the first calibration value as one of a plurality of entries in a calibration table along with a plurality of prior calibration values to form the calibration data.

8. The method of claim 7 further comprising:

receiving, at the processor, one or more second input parameters for the sensor map model;

generating a second simulated value for the aircraft sensor by applying the one or more second input parameters to the sensor map model via the processor;

selecting one of the plurality of entries in the calibration table using the one or more second input parameters and/or the second simulated value; and modifying the second simulated value with the selected one of the plurality of entries in the calibration table to generate the calibrated simulation value.

9. The method of claim 1 further comprising:

saving the first calibration value as one of a plurality of entries in a calibration table along with a plurality of prior calibration values; and generating a calibration function from the plurality of entries in the calibration table, wherein outputs of the calibration function comprise the calibration data.

10. The method of claim 9 further comprising:

receiving, at the processor, one or more second input parameters for the sensor map model;

generating a second simulated value for the aircraft sensor by applying the one or more second input parameters to the sensor map model via the processor;

generating a first output of the calibration function by applying the one or more second input parameters to the calibration function; and modifying the second simulated value with the first output of the calibration function to generate the calibrated simulation value.

11. An aircraft control system for an aircraft including a turbofan engine comprising:

an engine controller having a processor and a memory;

an aircraft sensor of the aircraft electrically coupled to the engine controller; and a memory that stores a sensor map model executable by the processor to simulate the aircraft sensor, wherein the processor executes the sensor map model using one or more first input parameters that are received by the processor to generate a first simulated value for the aircraft sensor, wherein the processor compares the first simulated value and a first output of the aircraft sensor to identify a first calibration value, wherein the processor identifies calibration data for the sensor map model based on the first calibration value, wherein the processor generates a calibrated simulation value of the aircraft sensor based on the sensor map model and the calibration data saved in the memory, wherein the processor receives a second output of the aircraft sensor, wherein the processor determines whether the second output of the aircraft sensor is valid or invalid, wherein the processor utilizes the second output of the aircraft sensor to perform an operation of the aircraft when the second output of the aircraft sensor is valid, wherein the processor utilizes the calibrated simulation value to perform the operation of the aircraft when the second output of the aircraft sensor is invalid, and wherein performing the operation comprises modulating at least one control parameter of the turbofan engine while the aircraft is operating.

12. The aircraft control system of claim 11 wherein the aircraft sensor includes an aircraft macro-condition sensor and the one or more first input parameters include first outputs of one or more aircraft engine sensors.

13. The aircraft control system of claim 12 wherein the aircraft macro-condition sensor includes a pitot-static tube that outputs an aircraft speed or Mach number.

14. The aircraft control system of claim 11 wherein the aircraft sensor includes an aircraft engine sensor and the one or more first input parameters include first outputs of other aircraft engine sensors and/or aircraft macro-condition sensors.

15. The aircraft control system of claim 11 wherein the processor identifies a difference between the first simulated value and the first output as the first calibration value and performs a weighted update of the calibration data saved in the memory based on the first calibration value.

16. The aircraft control system of claim 11 wherein the processor saves the first calibration value as one of a plurality of entries in a calibration table along with a plurality of prior calibration values to form the calibration data.

17. The aircraft control system of claim 16 wherein the processor selects one of the plurality of entries in the calibration table using one or more second input parameters for the sensor map model received by the processor and/or a second simulated value of the aircraft sensor that is output from execution of the sensor map model using the one or more second input parameters, and wherein the processor modifies the second simulated value with the selected one of the plurality of entries in the calibration table to generate the calibrated simulation value.

18. The aircraft control system of claim 11 wherein the calibration data includes a calibration function generated by the processor using the first calibration value and additional calibration values stored in the memory, wherein the processor applies one or more second input parameters for the sensor map model received by the processor to the calibration function to generate a first output of the calibration function, and wherein the processor modifies a second simulated value of the aircraft sensor with the first output of the calibration function to generate the calibrated simulation value, the second simulated value of the aircraft sensor being output from execution of the sensor map model using the one or more second input parameters.

19. A non-transitory computer readable medium storing instructions that, when executed by a processor, cause performance of operations comprising:

receiving, at a processor of an aircraft control system of an aircraft including a turbofan engine, one or more first input parameters for a sensor map model for simulating an aircraft sensor;

receiving, at the processor, a first output of the aircraft sensor;

generating a first simulated value for the aircraft sensor by applying the one or more first input parameters to the sensor map model via the processor;

comparing the first simulated value and the first output of the aircraft sensor to determine a first calibration value;

saving calibration data for the sensor map model in a memory electrically coupled to the processor, the calibration data being based on the first calibration value;

receiving, at the processor, a second output of the aircraft sensor;

generating, via the processor, a calibrated simulation value of the aircraft sensor based on the sensor map model and the calibration data saved in the memory;

determining whether the second output of the aircraft sensor is valid or invalid;

utilizing the second output of the aircraft sensor to perform an operation of the aircraft when the second output of the aircraft sensor is valid; and utilizing the calibrated simulation value to perform the operation of the aircraft when the second output of the aircraft sensor is invalid, wherein performing the operation comprises modulating at least one control parameter of the turbofan engine while the aircraft is operating.

20. The non-transitory computer readable medium of claim 19 wherein the instructions when executed by the processor cause performance of operations further comprising:

saving the first calibration value as one of a plurality of entries in a calibration table along with a plurality of prior calibration values to form the calibration data;

receiving, at the processor, one or more second input parameters for the sensor map model;

generating a second simulated value for the aircraft sensor by applying the one or more second input parameters to the sensor map model via the processor;

selecting one of the plurality of entries in the calibration table using the one or more second input parameters and/or the second simulated value; and modifying the second simulated value with the selected one of the plurality of entries in the calibration table to generate the calibrated simulation value.

\* \* \* \* \*